US012546631B2

(12) United States Patent
Schmitt et al.

(10) Patent No.: US 12,546,631 B2
(45) Date of Patent: Feb. 10, 2026

(54) MAGNETIC SENSING DEVICE

(71) Applicant: Analog Devices International Unlimited Company, Limerick (IE)

(72) Inventors: Jochen Schmitt, Biedenkopf (DE); Monsoon Dutt, London (GB); Stephen Morris, Basingstoke (GB)

(73) Assignee: Analog Devices International Unlimited Company, Limerick (IE)

( * ) Notice: Subject to any disclaimer, the term of this patent is extended or adjusted under 35 U.S.C. 154(b) by 258 days.

(21) Appl. No.: 18/248,520

(22) PCT Filed: Nov. 20, 2020

(86) PCT No.: PCT/EP2020/082973
§ 371 (c)(1),
(2) Date: Apr. 10, 2023

(87) PCT Pub. No.: WO2022/106034
PCT Pub. Date: May 27, 2022

(65) Prior Publication Data
US 2023/0375372 A1    Nov. 23, 2023

(51) Int. Cl.
*G01D 5/245* (2006.01)
(52) U.S. Cl.
CPC ....... *G01D 5/2455* (2013.01); *G01D 2205/26* (2021.05)
(58) Field of Classification Search
CPC ........ G01D 5/24; G01D 5/245; G01D 5/2455; G01D 2205/26; G01D 5/56; G01D 5/14;
(Continued)

(56) References Cited

U.S. PATENT DOCUMENTS 7,239,131 B2   7/2007  Halder et al.
7,671,583 B2   3/2010  Diegel et al.
(Continued)

FOREIGN PATENT DOCUMENTS

CN      112146555 A      12/2020
DE    102006039490 A1     3/2008
(Continued)

OTHER PUBLICATIONS

Diegel et al., A New Four Bit Magnetic Domain Wall Based Multiturn Counter. IEEE Transactions on Magnetics. Sep. 22, 2009;45(10): 3792-3795.
(Continued)

*Primary Examiner* — Son T Le
(74) *Attorney, Agent, or Firm* — Knobbe, Martens, Olson & Bear, LLP

(57) ABSTRACT

The present disclosure provides a magnetoresistive quadrant detector for use in a magnetic sensing device comprising a magnetic multi-turn sensor and an angle turn sensor, in particular, an angle sensor configured to provide 180° absolute angle measurements, such as an anisotropic magnetoresistive (AMR) angle sensor. The quadrant detector is formed of at least two magnetoresistive elements, preferably giant magnetoresistive (GMR) elements, which may be integrated to the multi-turn sensor die or provided on a separate die within the sensor package. The magnetoresistive elements are configured to provide a unique combination of resistance states for each quadrant of magnetic field direction. This quadrant information can then be used to remedy any ambiguities in the multi-turn measurement without needing 360° absolute angle information from the single turn angle sensor.

20 Claims, 14 Drawing Sheets

(58) Field of Classification Search
CPC ........... G01D 5/145; G01P 3/44; G01R 33/00; G01R 33/0005; G01R 33/09; G01R 33/093; G01R 33/096; G01R 33/098; G01R 33/12; G01R 33/1292
See application file for complete search history.

(56) References Cited

U.S. PATENT DOCUMENTS

| | | | |
|---|---|---|---|
| 8,179,130 | B2 | 5/2012 | Mattheis |
| 10,393,197 | B2 | 8/2019 | Baehr et al. |
| 10,415,998 | B2 | 9/2019 | Dietrich et al. |
| 10,731,737 | B2 | 8/2020 | Dietrich et al. |
| 10,739,163 | B2 | 8/2020 | Heyd et al. |
| 11,060,571 | B2 | 7/2021 | Dietrich |
| 11,398,765 | B2 | 7/2022 | Buchet et al. |
| 11,536,297 | B2 | 12/2022 | Hodrus |
| 12,111,220 | B2 | 10/2024 | Hintze et al. |
| 2009/0115405 | A1* | 5/2009 | Guo ................ G01D 5/145 427/598 |
| 2012/0223699 | A1* | 9/2012 | Holman, Jr. ......... G01D 5/145 324/207.2 |
| 2015/0130450 | A1 | 5/2015 | Gehringer et al. |
| 2017/0261345 | A1 | 9/2017 | Schmitt |
| 2017/0276740 | A1* | 9/2017 | Schmitt ............... G01R 33/091 |
| 2018/0172477 | A1 | 6/2018 | Dietrich et al. |
| 2018/0216965 | A1 | 8/2018 | Richard et al. |
| 2018/0356252 | A1 | 12/2018 | Diegel et al. |
| 2018/0372510 | A1 | 12/2018 | Mattheis et al. |
| 2019/0195613 | A1 | 6/2019 | Zimmer et al. |
| 2019/0383643 | A1 | 12/2019 | Schmitt et al. |
| 2019/0383645 | A1 | 12/2019 | Tonge et al. |
| 2020/0044591 | A1 | 2/2020 | Herzog et al. |
| 2020/0182314 | A1 | 6/2020 | Wei et al. |
| 2020/0300938 | A1 | 9/2020 | Schmitt et al. |
| 2022/0355863 | A1 | 11/2022 | Lindenmayr et al. |
| 2024/0317300 | A1 | 9/2024 | Pathan |

FOREIGN PATENT DOCUMENTS

| | | |
|---|---|---|
| DE | 102008063226 A1 | 7/2010 |
| DE | 102010010893 A1 | 9/2010 |
| DE | 102010022611 A1 | 12/2011 |
| DE | 102011075306 A1 | 11/2012 |
| DE | 102011080050 A1 | 1/2013 |
| DE | 102012008888 A1 | 10/2013 |
| DE | 102013018680 A1 | 5/2015 |
| DE | 102016111995 A1 | 1/2018 |
| DE | 102016212925 A1 | 1/2018 |
| DE | 102018118258 A1 | 1/2020 |
| DE | 102018130778 A1 | 1/2020 |
| DE | 102018120419 A1 | 2/2020 |
| DE | 102020114871 A1 | 9/2021 |
| DE | 102020115906 A1 | 9/2021 |
| DE | 102020108981 A1 | 10/2021 |
| DE | 102020108982 A1 | 10/2021 |
| DE | 102018222879 B4 | 9/2022 |
| DE | 102021111644 A1 | 11/2022 |
| DE | 102022102110 A1 | 8/2023 |
| DE | 102022132777 A1 | 6/2024 |
| EP | 3523608 A1 | 8/2019 |
| EP | 3645980 B1 | 5/2020 |
| EP | 3387387 B1 | 3/2021 |
| EP | 3387388 B1 | 3/2021 |
| JP | 4224033 B2 | 2/2009 |
| JP | 2017-161524 A | 9/2017 |
| JP | 2019-174466 A | 10/2019 |
| JP | 2019-219392 A | 12/2019 |
| WO | WO 2007/006742 A1 | 1/2007 |
| WO | WO 2015/062573 A1 | 5/2015 |
| WO | WO 2018/028739 A1 | 2/2018 |
| WO | WO 2018/149446 A1 | 8/2018 |
| WO | WO 2018/224081 A1 | 12/2018 |
| WO | WO 2020/164882 A1 | 8/2020 |
| WO | WO 2023/147801 A1 | 8/2023 |

OTHER PUBLICATIONS

Mattheis et al., Multiturn Counter Using the Movement and Storage of 180 Magnetic Domain Walls. IEEE Transactions on Magnetics. Sep. 25, 2006;42(10): 3297-3299.
International Search Report and Written Opinion dated Aug. 5, 2021 for Application No. PCT/EP2020/082973 in 13 pages.
Notice of Allowance dated Feb. 4, 2025 in Japanese Application No. 2023-522517, in 5 pages.

* cited by examiner

MAGNETIC SENSING DEVICE

CROSS-REFERENCE TO RELATED APPLICATION(S)

This application is a 371 of International Application No. PCT/EP2020/082973, filed Nov. 20, 2020, the entire technical disclosure of which is hereby incorporated by reference.

FIELD OF DISCLOSURE

The present disclosure relates to a magnetic sensing device and method of use. In particular, the present disclosure relates to a magnetic sensing device that implements a magnetoresistive quadrant detector.

BACKGROUND

Magnetic sensing devices comprising single turn angle sensors and multi-turn sensors are commonly used in applications where there is a need to monitor both the number of times a device has been turned and its precise angular position. An example is a steering wheel in a vehicle.

Magnetic multi-turn sensors typically include magnetoresistive elements that are sensitive to an applied external magnetic field. The resistance of the magnetoresistive elements can be changed by rotating a magnetic field within the vicinity of the sensor. Variations in the resistance of the magnetoresistive elements will be tracked to determine the number of turns in the magnetic fields, which can be translated to a number of turns in the device being monitored. Typically, multi-turn sensors comprise a plurality of magnetoresistive elements laid out as a strip in an open loop spiral or closed loop spiral. Domain walls are caused to propagate around the spiral in response to rotations of an external magnetic field, causing the magnetic alignment of each element to change as it propagates through, which causes a corresponding change in resistance.

Similarly, magnetic angle sensors measure the magnetic field angle of the rotating magnetic field, which can be translated to an angular position of the device being monitored.

SUMMARY OF DISCLOSURE

The present disclosure provides a magnetoresistive quadrant detector for use in a magnetic sensing device comprising a magnetic multi-turn sensor and an angle turn sensor, in particular, an angle sensor configured to provide 180° absolute angle measurements, such as an anisotropic magnetoresistive (AMR) angle sensor. The quadrant detector is formed of at least two magnetoresistive elements, preferably giant magnetoresistive (GMR) elements, which may be integrated to the multi-turn sensor die or provided on a separate die within the sensor package. The magnetoresistive elements are configured to provide a unique combination of resistance states for each quadrant of magnetic field direction. This quadrant information can then be used to remedy any ambiguities in the multi-turn measurement without needing 360° absolute angle information from the single turn angle sensor.

Accordingly, a first aspect of the present disclosure provides a magnetic sensing device, comprising:
a magnetic multi-turn sensor configured to detect a number of turns of a rotating magnetic field;
an angle sensor configured to detect an orientation of the rotating magnetic field, the angle sensor having a resolution of 180 degrees; and
a quadrant detector comprising at least two magnetoresistive elements, the quadrant detector being configured to detect a quadrant of a magnetic field angle of the rotating magnetic field.

Angle sensors providing 180° absolute angle information, such as an AMR-based angle sensor, are typically more robust and precise than those providing 360° angle information. However, 360° angle information is needed to resolve ambiguities in the signal output of magnetic multi-turn sensors caused by differences in when domain walls begin to propagate along the sensing elements of the multi-turn sensor each time the magnetic field rotates a quarter or half turn, which can cause the resistances of those sensing elements to change too early or too late. Therefore, by providing a separate magnetoresistive quadrant detector to identify which quadrant the magnetic field angle is in, the multi-turn sensor can be advantageously used in combination with an angle sensor having a resolution of 180°. In this respect, the quadrant detector combined with the 180° angle information effectively provides the 360° absolute angle information that the multi-turn sensor needs to ensure the ambiguities do not result in an incorrect turn count reading.

The device may further comprise a processing circuit in communication with the multi-turn sensor, the angle sensor and the quadrant detector.

The at least two magnetoresistive elements of the quadrant detector may have at least two states, each state having an associated resistance, wherein the processing circuit is configured to detect a sequence of states of the at least two magnetoresistive elements as the magnetic field rotates to determine the quadrant of the rotating magnetic field. In this respect, each quadrant corresponds to a predetermined set of states. That is to say, as the magnetic field rotates, the resistance states of the magnetoresistive elements will change according to a unique sequence, such that a different set of states will be output when the magnetic field angle is in each quadrant. For example, a first set of states will be output for 0 to 90°, a second set of states will be output for 90 to 180°, a third set of states will be output for 180 to 270° and a fourth set of states will be output for 270 to 360°, wherein the first, second, third and fourth sets are all different combinations of possible resistance states.

The processing circuit may be configured to process a signal output by the multi-turn sensor based at least in part on the detected quadrant and the detected orientation of the magnetic field to determine the number of turns. In this respect, the processing circuit will use the detected quadrant and 180° angle information to confirm the turn count measured by the multi-turn sensor and correct any incorrect readings due to differences in the length of time it takes domain walls to propagate the sensing elements of the multi-turn sensor.

The quadrant detector may comprise two separate magnetoresistive elements, wherein each magnetoresistive element is connected to at least one domain wall generator for injecting domain walls into the quadrant detector as the magnetic field rotates. For example, each magnetoresistive element may be connected to two domain wall generators, the domain wall generators being located at opposite ends of the magnetoresistive elements. By separating the magnetoresistive elements, they can be located anywhere on the sensing device, without taking up a significant amount of space.

The quadrant detector may further comprise a pair of reference magnetoresistive elements. That is to say, the quadrant detector may comprises two further magnetoresistive elements where the magnetic alignment and thus the resistance does not change, to thereby act as a reference point for the magnetoresistive elements of the quadrant detector. The reference magnetoresistive elements may each be connected with one of the magnetoresistive elements of the quadrant detector to provide half bridge outputs.

Alternatively, the quadrant detector may comprise two magnetoresistive elements connected in series, and at least one domain wall generator connected thereto for injecting domain walls into the quadrant detector as the magnetic field rotates. In such cases, one domain wall generator will be provided between the two magnetoresistive elements, and optionally, two further domain wall generators, each located at the opposite ends of the magnetoresistive elements.

In another arrangement, the quadrant detector may comprise four magnetoresistive elements connected in series in a loop configuration. In some cases, the quadrant detector may be provided without a domain wall generator. Alternatively, the quadrant detector may comprise at least one domain wall generator for injecting domain walls into the quadrant detector as the magnetic field rotates, and preferably, two or more domain wall generators, each domain wall generator being connected between two magnetoresistive elements. In such cases, the domain wall generators are preferably provided at opposite corners of the loop. The quadrant detector may also be provided with a domain wall generator at every corner, as this helps to prevent domain walls from becoming stuck along the loop. By providing the quadrant detector loop with domain wall generators, no initialisation is required prior to use.

The multi-turn sensor may comprise a plurality of magnetoresistive elements connected in series and physically laid out in a spiral configuration, wherein the quadrant detector and the multi-turn sensor are integrated, such that at least two magnetoresistive elements of the plurality of magnetoresistive elements provide the quadrant detector. That is to say, the quadrant detector may be provided by at least two separated single elements, a winding, or half of a winding, of the multi-turn sensor, wherein the magnetoresistive elements of this winding do not contribute to the turn count and are used solely to detect the magnetic field angle quadrant The multi-turn sensor may further comprise a matrix of electrical connections arranged to electrically connect magnetoresistive elements of the plurality of magnetoresistive elements to other magnetoresistive elements of the plurality of magnetoresistive elements, the matrix being at least three by three.

The multi-turn sensor, the angle sensor and the quadrant detector may be arranged on a first integrated circuit board. The processing circuit may also be arranged on the first integrated circuit board, or it may be provided in a separate computing device.

The at least two magnetoresistive elements of the quadrant detector may be giant magnetoresistive (GMR) elements or tunnel magnetoresistive (TMR) elements.

The angle sensor may be an anisotropic magnetoresistive (AMR) based angle sensor.

The magnetic multi-turn sensor may be a giant magnetoresistive (GMR) based multi-turn sensor, or a tunnel magnetoresistive (TMR) based multi-turn sensor.

A further aspect of the present disclosure provides a method of monitoring a rotating magnetic field, comprising:

detecting a number of turns of the rotating magnetic field using a magnetic multi-turn sensor;
    detecting an orientation of the rotating magnetic field using an angle sensor having a resolution of 180 degrees; and
    detecting a quadrant of a magnetic field angle of the rotating magnetic field using a quadrant detector, the quadrant detector comprising at least two magnetoresistive elements;
    wherein the number of turns is determined based at least in part on the detected orientation and the detected quadrant.

The at least two magnetoresistive elements of the quadrant detector may have at least two states, each state having an associated resistance, wherein detecting the quadrant comprises detecting a sequence of states of the at least two magnetoresistive elements as the magnetic field rotates.

In this respect, each quadrant corresponds to a predetermined set of states.

The quadrant detector may comprise two separate magnetoresistive elements, wherein each magnetoresistive element is connected to at least one domain wall generator for injecting domain walls into the quadrant detector as the magnetic field rotates. For example, each magnetoresistive element may be connected to two domain wall generators, the domain wall generators being located at opposite ends of the magnetoresistive elements.

The quadrant detector may further comprise a pair of reference magnetoresistive elements. That is to say, the quadrant detector may comprises two further magnetoresistive elements where the magnetic alignment and thus the resistance does not change, to thereby act as a reference point for the magnetoresistive elements of the quadrant detector. The reference magnetoresistive elements may each be connected with one of the magnetoresistive elements of the quadrant detector to provide half bridge outputs.

Alternatively, The quadrant detector may comprises two magnetoresistive elements connected in series, and at least one domain wall generator connected thereto for injecting domain walls into the quadrant detector as the magnetic field rotates. In such cases, one domain wall generator will be provided between the two magnetoresistive elements, and optionally, two further domain wall generators, each located at the opposite ends of the magnetoresistive elements.

In another arrangement, the quadrant detector may comprise four magnetoresistive elements connected in series in a loop configuration. The quadrant detector may be provided without a domain wall generator, in which case the quadrant detector will be initialised prior to use so that it is nucleated with domain walls. Alternatively, the quadrant detector may comprise at least one domain wall generator for injecting domain walls into the quadrant detector as the magnetic field rotates, and preferably, two or more domain wall generators, each domain wall generator being connected between two magnetoresistive elements. In such cases, the domain wall generators are preferably provided at opposite corners of the loop. The quadrant detector may also be provided with a domain wall generator at every corner, as this helps to prevent domain walls from becoming stuck along the loop.

The multi-turn sensor may comprise a plurality of magnetoresistive elements connected in series and physically laid out in a spiral configuration, and wherein the quadrant detector and the multi-turn sensor are integrated, such that at least two magnetoresistive elements of the plurality of magnetoresistive elements provide the quadrant detector. That is to say, the quadrant detector may be provided by a winding, or half of a winding, of the multi-turn sensor, wherein the magnetoresistive elements of this winding do not contribute to the turn count and are used solely to detect the magnetic field angle quadrant.

The at least two magnetoresistive elements of the quadrant detector may be giant magnetoresistive (GMR) elements or tunnel magnetoresistive (TMR) elements.

The angle sensor may be an anisotropic magnetoresistive (AMR) based angle sensor.

The magnetic multi-turn sensor may be a giant magnetoresistive (GMR) based multi-turn sensor, or a tunnel magnetoresistive (TMR) based multi-turn sensor.

A further aspect of the present disclosure provides a computer system comprising:
  a processor; and
  a computer readable medium storing one or more instruction(s) arranged such that when executed the processor is caused to perform the method described above.

BRIEF DESCRIPTION OF THE DRAWINGS

The present disclosure will now be described by way of example only with reference to the accompanying drawings in which.

DETAILED DESCRIPTION

Magnetic multi-turn and single turn angle sensors can be used to monitor the turn count and angular position of a rotating shaft. Such magnetic sensing can be applied to a variety of different applications, such as automotive applications, medical applications, industrial control applications, consumer applications, and a host of other applications which require information regarding a position of a rotating component.

For counting the number of turns, an xMR multi-turn sensor, typically, giant magnetoresistive or tunnel magnetoresistive, based on domain wall propagation in an open or closed loop spiral is used. These are then combined with a single turn angle sensor, which gives the absolute angle information within each turn. For current multi-turn sensor architectures, examples of which are described below, any Hall or xMR based angle sensor can be used. The only exception to this is anisotropic magnetoresistive (AMR) based angle sensors, as these only provide 180° absolute angle information. AMR sensors output a sine and cosine signal with a periodicity of two periods per revolution, such that the angular position within each half turn is provided. This type of angle sensor is very robust and provides a very precise angular measurement compared to Hall or other xMR based angle sensors, however, 360° information is needed when using an xMR based multi-turn sensor and so an AMR based sensor is not sufficient.

Figure 2A:
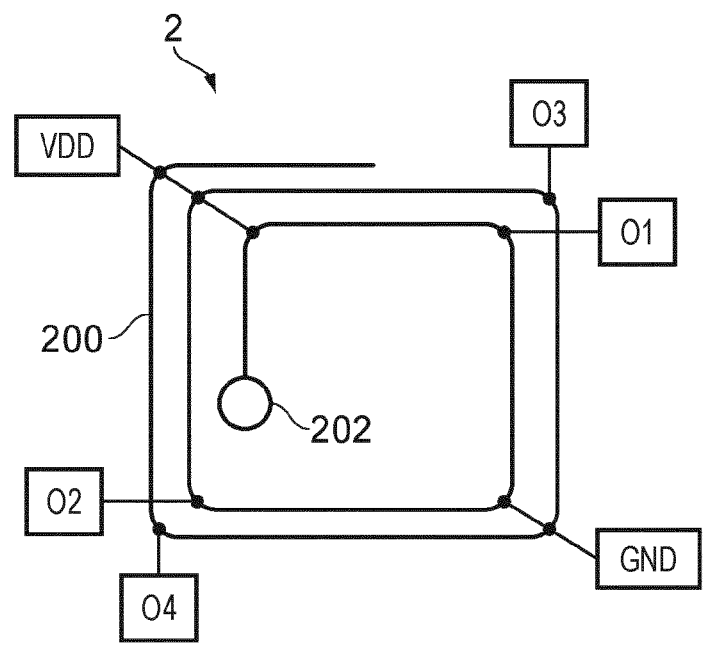
FIG. 2A is an example of a magnetic multi-turn sensor in accordance with embodiments of the disclosure.
Figure 2B:
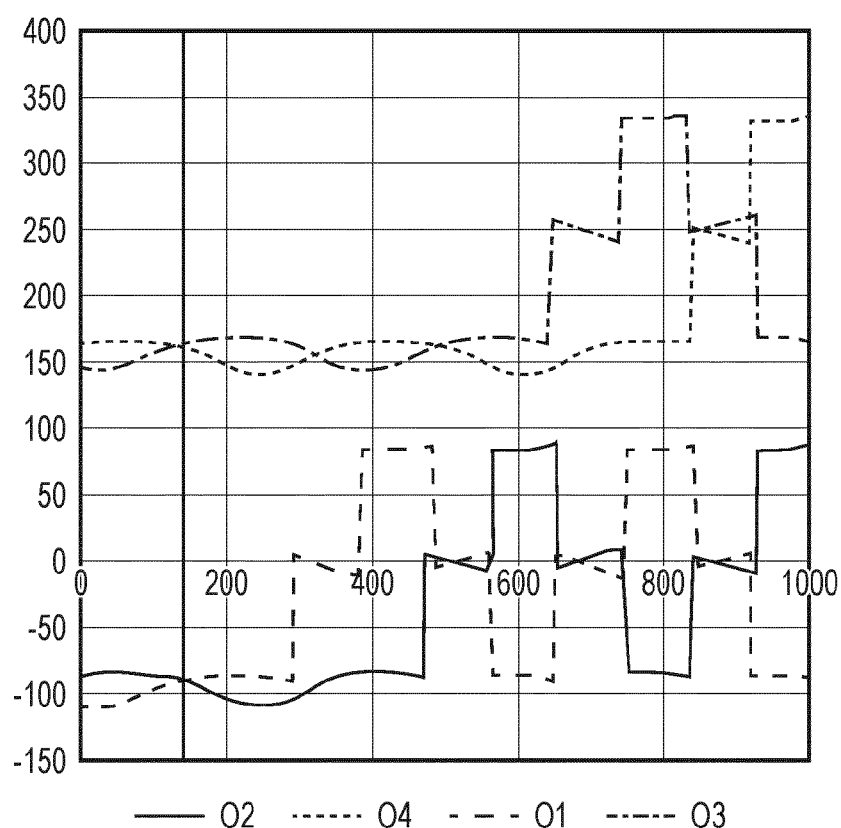
FIG. 2B illustrates an output of the multi-turn sensor of FIG. 2A.

The reason 360° angle information is needed is to account for ambiguities in the multi-turn count due to differences in when the domain walls propagate from corner to corner as the magnetic field rotates. In this respect, a domain wall will propagate each time at a slightly different magnetic field angle. This is because the domain wall is continuously changing shape, and the shape it has when it stops propagating (i.e. when it reaches a corner) will determine the field angle at which it will start propagating again. As a result, there can be ambiguities of +/−10 degree for every quarter or half turn, which can result in an incorrect turn count reading if it is not known how far the magnetic field has rotated within each turn. From a 360° angle measurement, it is possible to track where the domain walls should be within the spiral and match up the changes in resistance of each magnetoresistive sensor element in the multi-turn sensor. For example, FIG. 2A illustrates a basic open loop multi-turn sensor 2 comprising a plurality of magnetoresistive sensor elements 200 laid out in a spiral, and connected using half bridge outputs O1, O2, O3 and O4. One end of the spiral is connected to a domain wall generator 202, which injects domain walls into the spiral as an external magnetic field (not shown) is rotated. FIG. 2B illustrates the changes in resistance at each output as a magnetic field rotates and propagates the injected domain walls through the spiral. As can be seen from FIG. 2B, each output changes resistance at a slightly different point within each 90° rotation, which can result in the transition points being misinterpreted as relating to either the preceding or following 90° turn. Therefore, a 360° angle measurement is needed to confirm whether the correct turn count has been attributed to a measured change in resistance, and thus a 180° absolute angle sensor does not provide sufficient information to make this +/−10 degree ambiguity an acceptable tolerance level.

The solution is therefore to use a magnetoresistive quadrant detector, preferably, GMR based, to determine which quadrant the magnetic field is in, so that the AMR angle measurement and the multi-turn sensor outputs can be mapped to the correct field angle quadrant.

As will be described in more detail below, the quadrant detector may be in the form of two magnetoresistive elements connected to one or more domain wall generators, or a loop of four magnetoresistive elements, with or without domain wall generators. As the magnetic field rotates, domain walls will propagate along the resistor elements such that a unique sequence of resistance states for each magnetic field quadrant is output.

Figure 1:
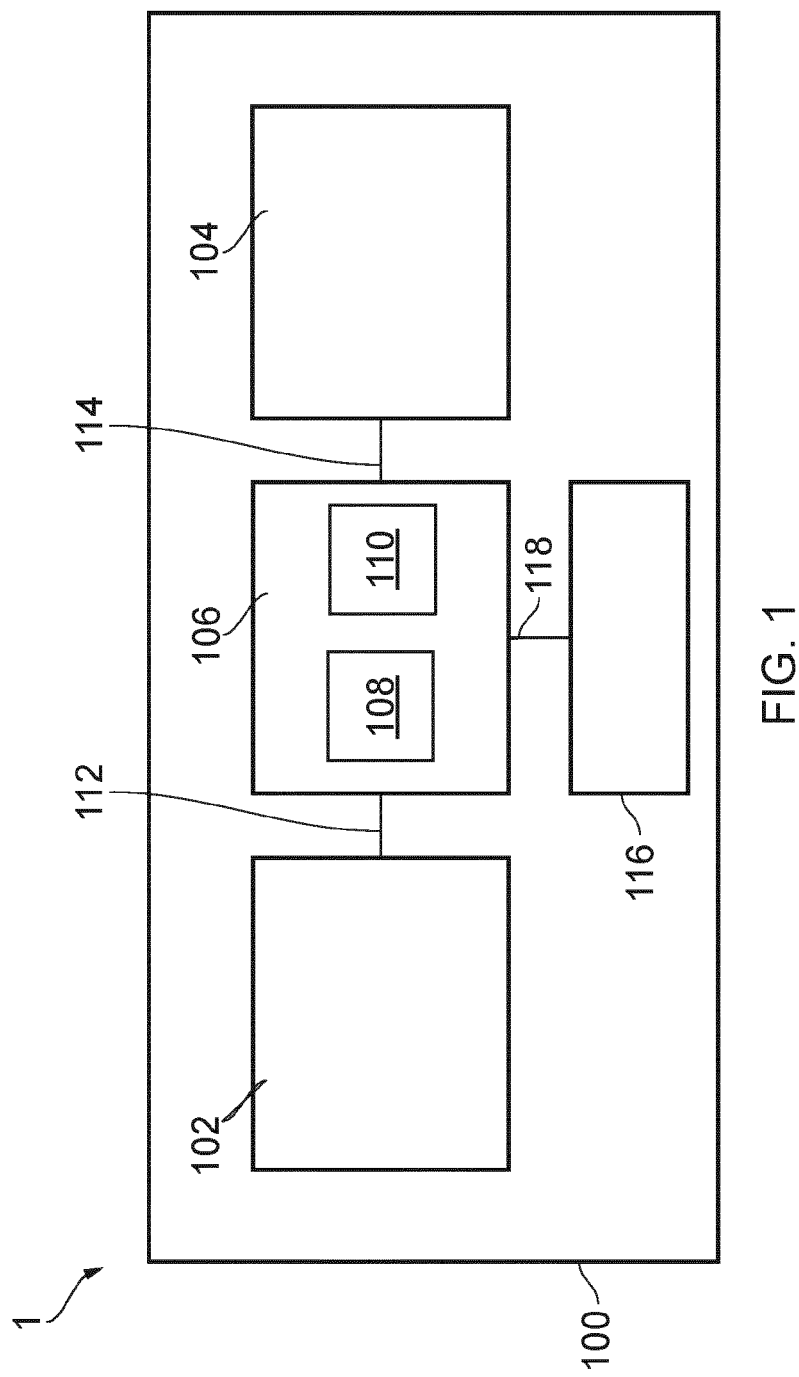
FIG. 1 is a schematic top view of a magnetic sensing device in accordance with an embodiment of the disclosure.

FIG. 1 illustrates a schematic block diagram of an example magnetic sensing device 1 that includes a multi-turn (MT) sensor 102 and an angle sensor 104 provided in a single semiconductor package. The MT sensor 102 is preferably a giant magnetoresistive (GMR) or tunnel magnetoresistive (TMR) based MT sensor. The angle sensor 104 is preferably an anisotropic magnetoresistive (AMR) based sensor configured to measure angular position over a 180° range to thereby provide an accurate angular position within each half turn counted by the MT sensor 102, although it will be appreciated that other angle sensors such as a Hall sensor, a GMR based angle sensor or TMR based angle sensor could still be used. In general, a 180° AMR single turn sensor provides more precision than other magnetic angle sensor, and is generally more robust. In this respect, an AMR sensor can operate in higher magnetic fields, and therefore less susceptible to faults due to stray fields and the like. For example, tunnel magnetoresistive (TMR) or giant magnetoresistive (GMR) based angle sensors often experience hysteresis problems, which can lead to different results for clockwise and anti-clockwise rotation.

The sensing device 1 also comprises a processing circuit 106, and an integrated circuit 100 on which the MT sensor 102, the angle sensor 104 and processing circuit 106 are disposed. The processing circuit 106 receives signals $S_{MT}$ 112 from the MT sensor 102 and processes the received signals to determine that the turn count using a turn count decoder 108, which will output a turn count representative of the number of turns of an external magnetic field (not shown) rotating in the vicinity of the MT sensor 102, for example, a magnetic field generated by a magnet mounted on a rotating shaft. Similarly, the processing circuit 106 may also receive signals $S_A$ 114 from the angle sensor 104 and process the received signals using an angle decoder 110 to output an angular position of the external magnetic field.

The sensing device 1 also comprises a quadrant detector 116 according to embodiments of the present disclosure, which is also disposed on the same integrated circuit 100. The processing circuit 106 is then also arranged to receive signals $S_Q$ 118 from the quadrant detector 116, which may then be fed in to the turn count decoder 108 and/or angle decoder 110 to determine which quadrant the magnetic field angle is in, which can then be used to correctly interpret the sensor outputs of the MT sensor 102 and the angle sensor 104.

It will also be appreciated that the signals from the MT sensor 102, angle sensor 104 and quadrant detector 116 may be processed by some other external processing means. For example, a separate computing device (not shown) having a processor and a computer readable storage medium for storing instructions that, when executed by the processor, cause the processor to determine number of turns and orientation of the magnetic field based on the signals received from the MT sensor 102, angle sensor 104 and quadrant detector 116 via a wired or wireless connection.

Figure 3A:
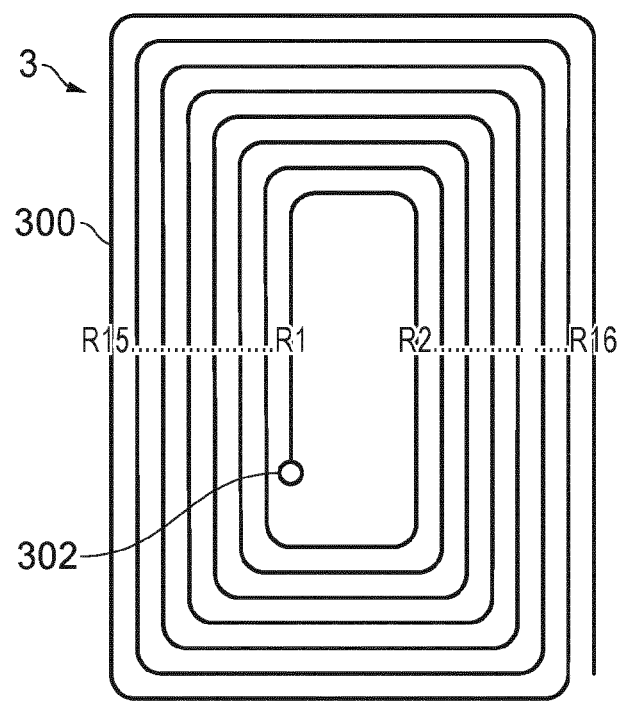
FIG. 3A is an example of a magnetic multi-turn sensor in accordance with embodiments of the disclosure.
Figure 3B:
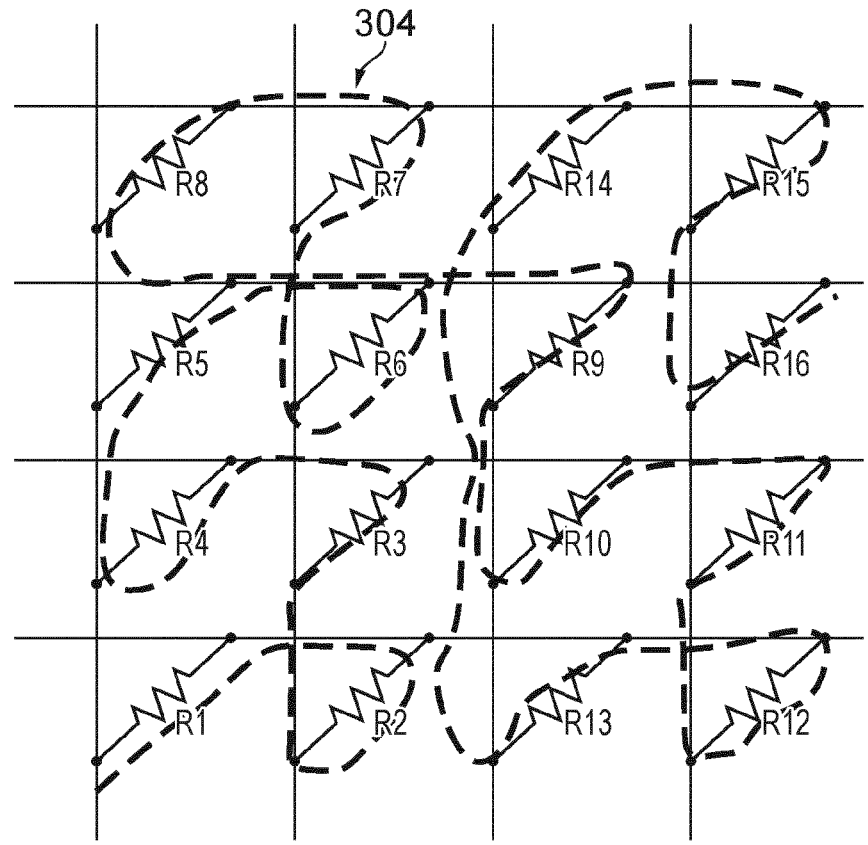
FIG. 3B illustrates an output of the multi-turn sensor of FIG. 3A.

As described above with reference to FIG. 2B, the MT sensor 102 may be in an open loop configuration with a domain wall generator, with the magnetoresistive elements connected as half bridge outputs. Alternatively, as shown in FIG. 3A, the MT sensor 102 may be in the form of an open loop multi-turn sensor 3 comprising a plurality of magnetoresistive sensing elements R1-R16 defining two sides of the spiral 300, with the first magnetoresistive element R1 being connected to a domain wall generator 302. As shown in FIG. 3, the magnetoresistive elements R1-R16 are connected via a matrix of electrical connections 304. In this example, as the resistor elements on only two sides of the spiral 300 are being measured, the resistor states will change with each 180° rotation of the magnetic field with a tolerance of +/−10 degrees. Again, an angle sensor providing 360° information is typically needed to resolve any ambiguities between the sensor outputs.

Figure 4A:
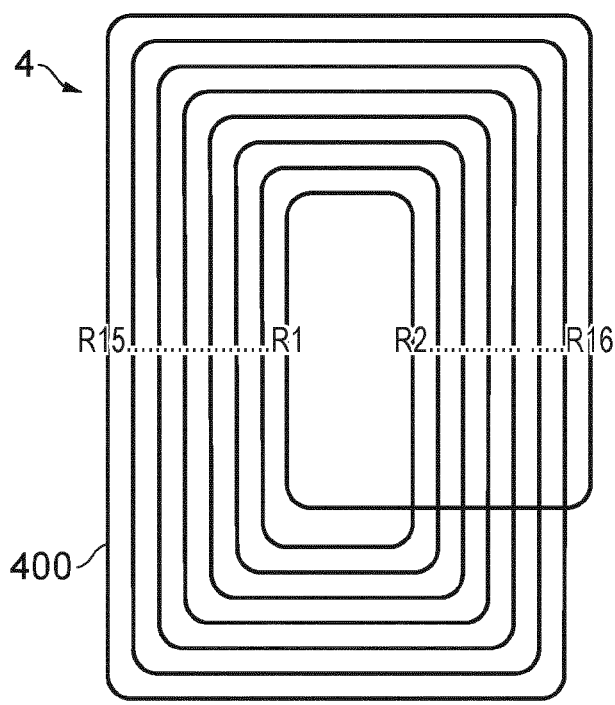
FIG. 4A is an example of a magnetic multi-turn sensor in accordance with embodiments of the disclosure.
Figure 4B:
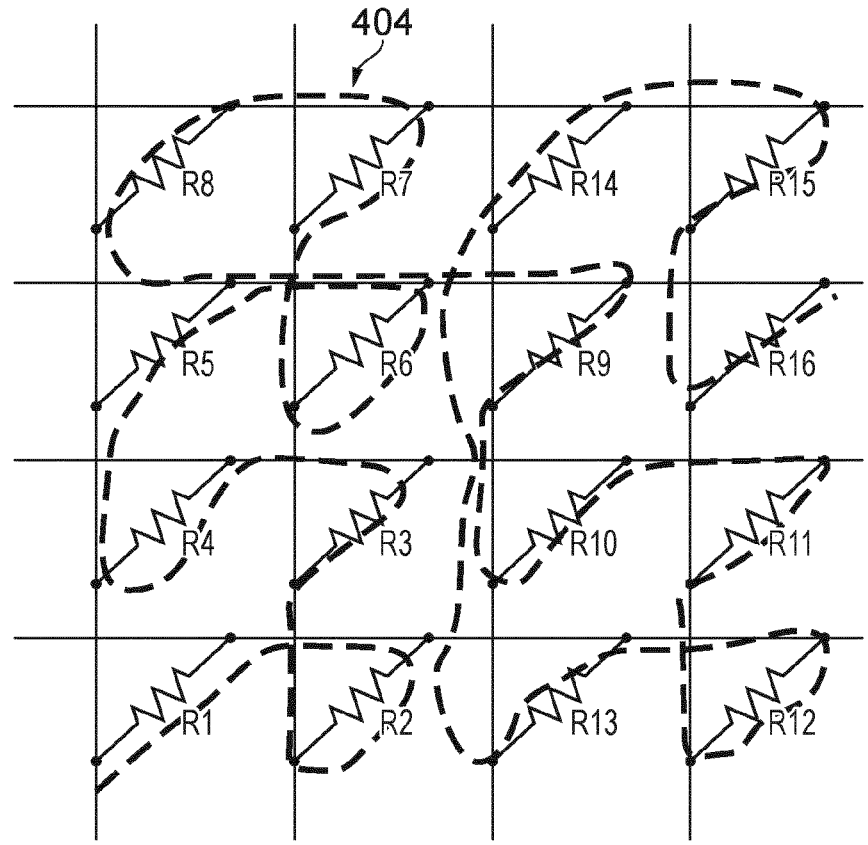
FIG. 4B illustrates an output of the multi-turn sensor of FIG. 4A.

FIG. 4A shows a further example of an MT sensor 4, in the form of a closed loop multi-turn sensor 4. As with FIG. 3A, the sensor 4 comprises a plurality of magnetoresistive sensing elements R1-R16 defining two sides of the spiral 400 connected via a matrix of electrical connections 404, as shown by FIG. 4B. As such, the resistor states will again change with each 180° rotation of the magnetic field with a tolerance of +/−10 degrees.

In a closed loop sensor 4, however, a domain wall generator is not needed. Instead, the sensor 4 will be nucleated with domain walls prior to installation, for example, by application of a strong rotating magnetic field, which will then propagate continuously around the continuous spiral as the external magnetic field rotates.

The quadrant detector according to embodiments of the disclosure will now be described.

Figure 5A:
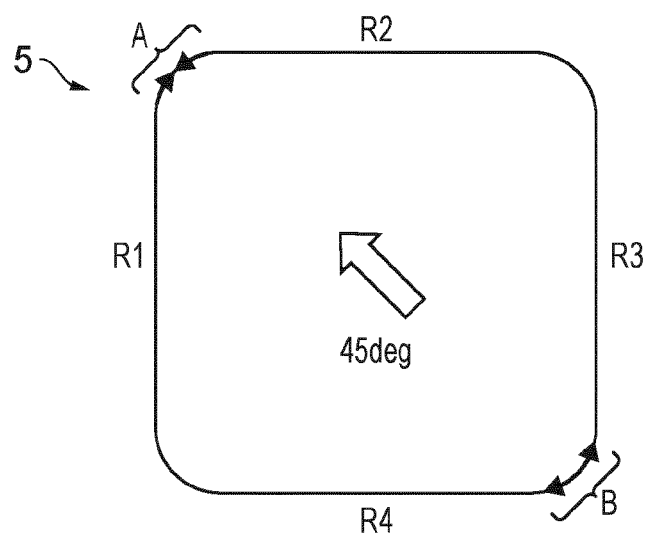
FIGS. 5A-5D illustrate a quadrant detector in accordance with embodiments of the disclosure.

FIGS. 5A-5D illustrate a first example of a quadrant detector 5 that may be used as the quadrant detector 116 shown in FIG. 1. The quadrant detector 5 is a closed loop of GMR material, defining four magnetoresistive elements R1-R4. The loop is populated with two domain walls, shown by arrow pairs A and B in FIG. 5A, which are made to propagate from corner to corner by the external rotating magnetic field, the direction of which is denoted by the arrow in the centre of the sensor 5. FIG. 5A shows the starting point, when the magnetic alignment of the antiferromagnetic layer of the GMR material is pinned at 45°, such that all of the magnetoresistive elements have the same resistance state, which in this example is a low resistance state. The magnetoresistive elements will all have the same resistance state when the antiferromagnetic layer of the GMR material is pinned in the same direction, which in this example is 45°. Therefore, it will be appreciated that the starting point could be at any angle where this is the case. The quadrant detector 5 can be initialised into this state in any suitable way, for example, by application of a strong rotating magnetic field.

Figure 5B:
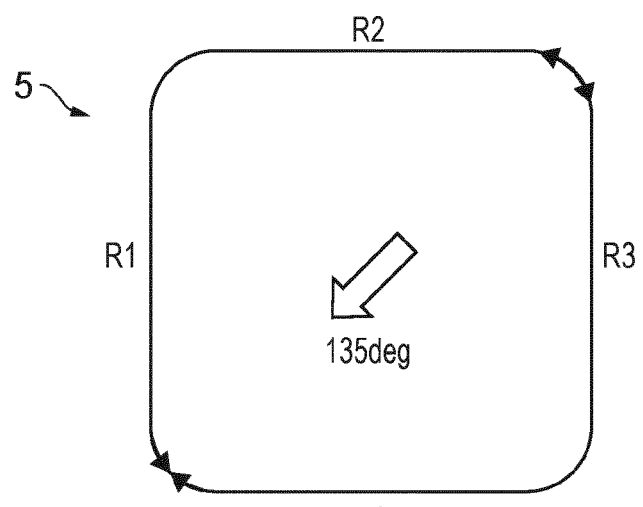
Figure 5C:
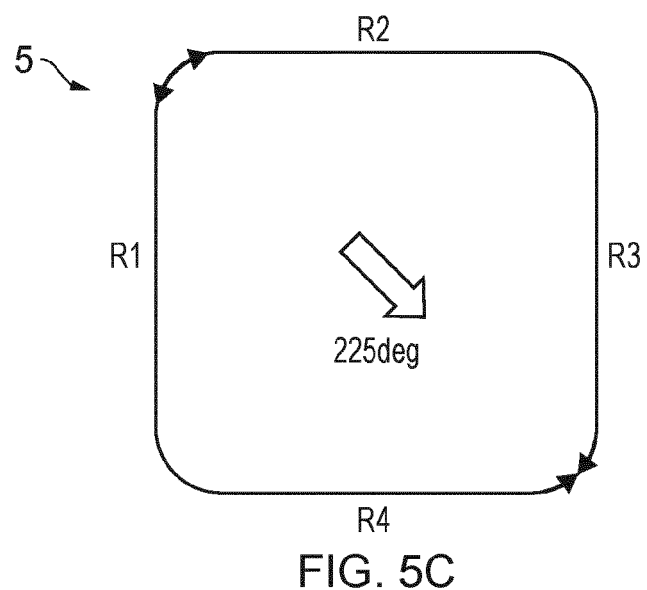
Figure 5D:
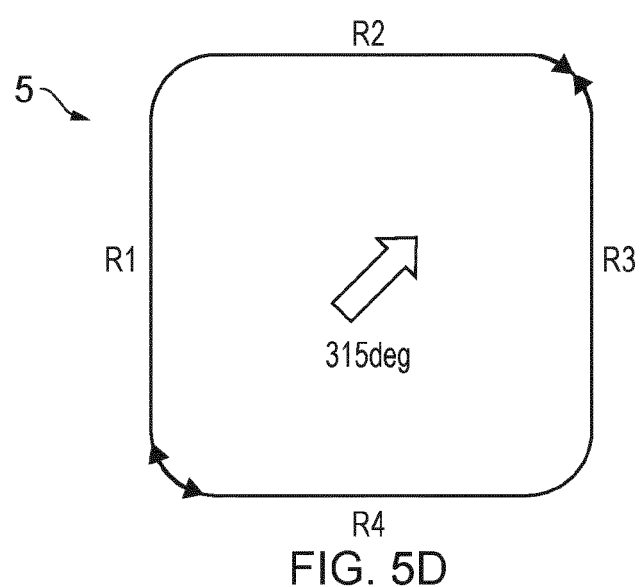
Figure 6A:
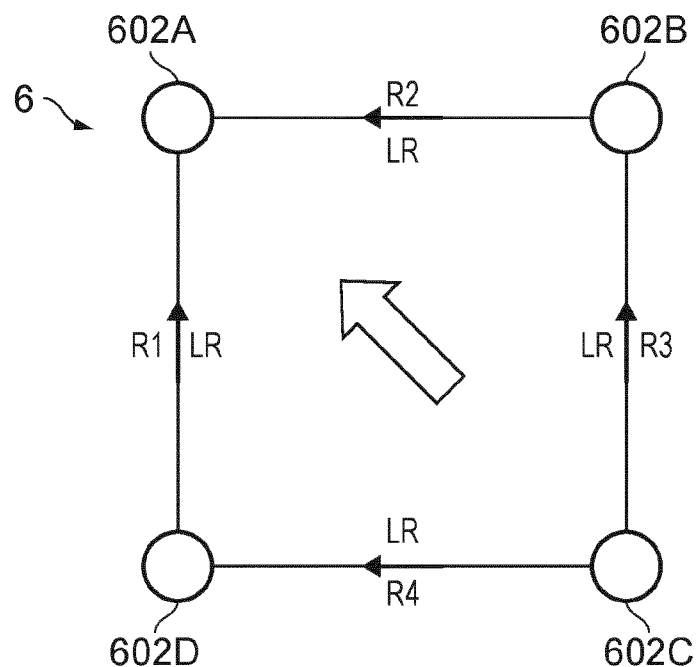
FIGS. 6A-6D illustrate a further quadrant detector in accordance with embodiments of the disclosure.
Figure 6B:
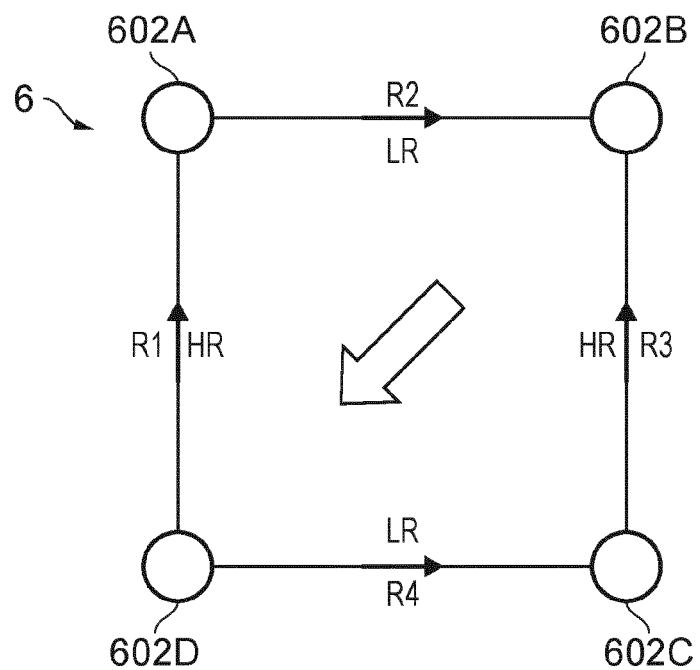
Figure 6C:
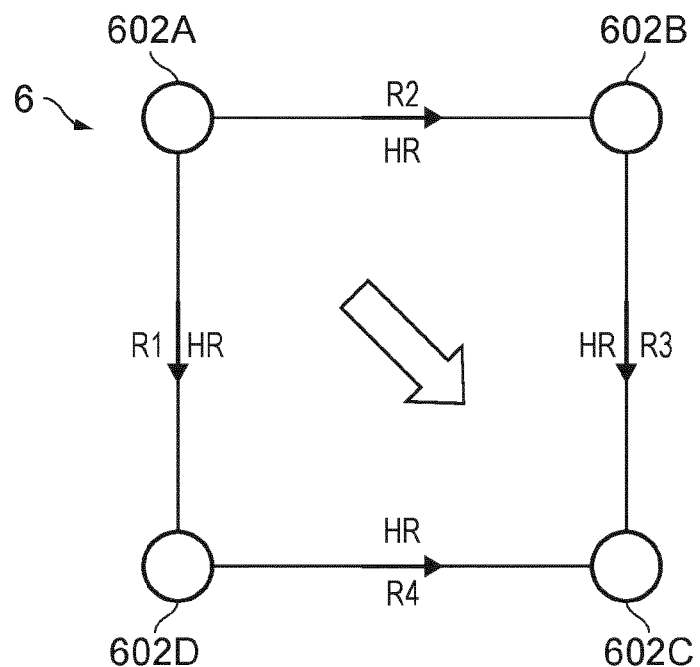
Figure 6D:
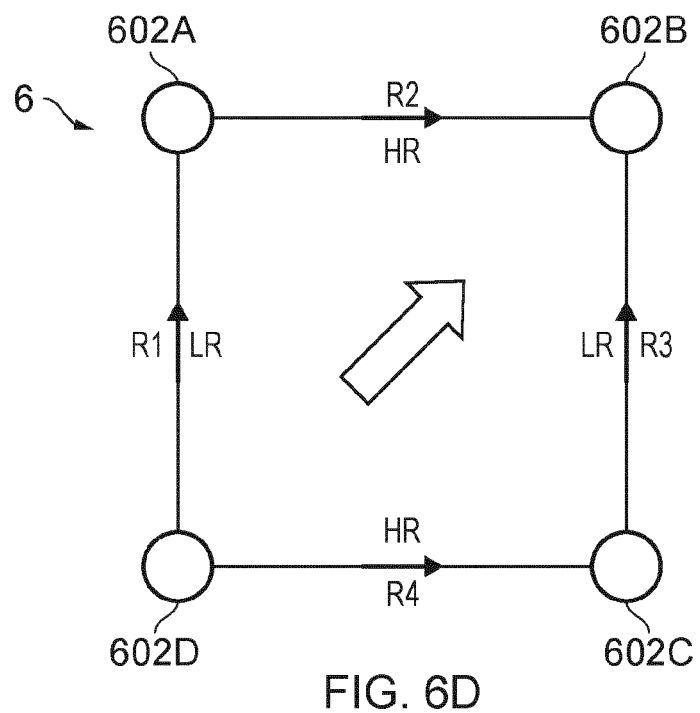

In use, as the magnetic field rotates, illustrated by FIGS. 5B-5D, the domain walls propagate to the next corner every 90° turn so as to change the magnetic alignment of the magnetoresistive element R1-R4 as the domain wall passes through and thereby change the resistance from a high to low state, and vice versa. Table 1 below shows how the resistors R1-R4 change with magnetic field angle.

TABLE 1

| Field Angle | R1 | R2 | R3 | R4 |
|---|---|---|---|---|
| Q1: 0°-90° | low | low | low | low |
| Q2: 90°-180° | high | low | high | low |
| Q3: 180°-270° | high | high | high | high |
| Q4: 270°-360° | low | high | low | high |

As can be seen, a unique sequence of resistance states is output for each magnetic field quadrant. As such, at any given time, the set of resistance states measured at each of the magnetoresistive elements R1-R4 will be indicative of a specific quadrant without the need for any further processing.

A further example of a quadrant detector is provided by FIGS. 6A-6D, wherein the quadrant detector 6 is again formed by a closed loop of GMR material defining four magnetoresistive elements R1-R4. In this example, a domain wall generator 602A-D is provided at each corner of the loop. Unlike the example shown with reference to FIGS. 5A-5D, this architecture does not need to be initialised so as to populate the loop with domain walls and pin the magnetic alignment of the magnetoresistive elements in the required direction before it can be used. The domain wall generators will instead force the magnetoresistive elements to be magnetised according to the direction of the external magnetic field. Whilst this example has four domain wall generators, which is advantageous in that it helps to prevent a domain wall from getting accidentally pinned along the loop, it will be appreciated that two domain wall generators in opposing corners would also be sufficient.

As with the previous example, the magnetoresistive elements output a unique sequence of resistance states (denoted "LR" for low resistance and "HR" for high resistance) for each quadrant of magnetic field angle.

Figure 7:
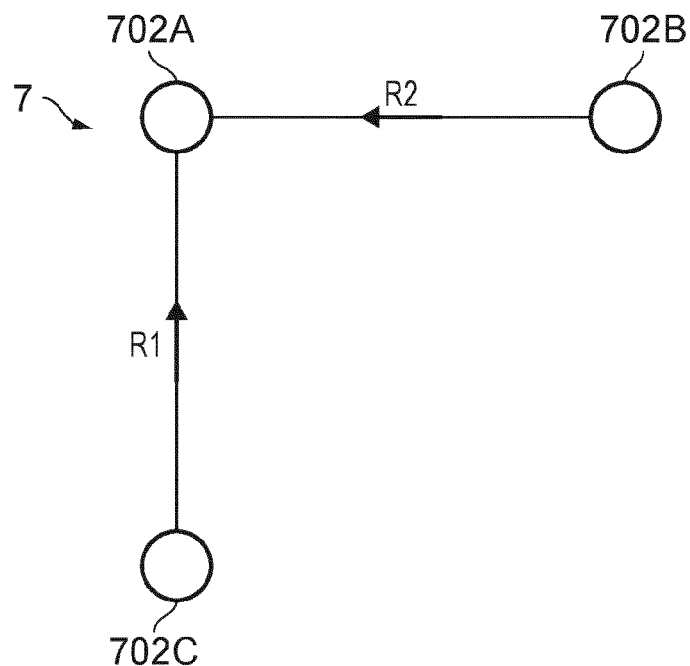
FIG. 7 illustrates a further quadrant detector in accordance with embodiments of the disclosure.
Figure 8:
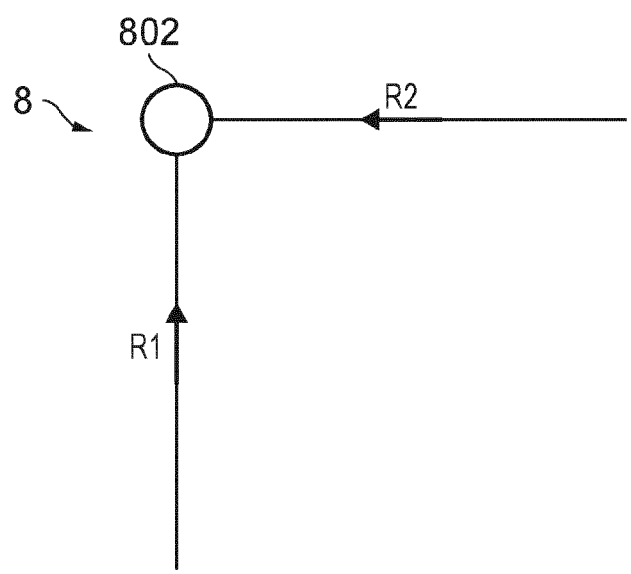
FIG. 8 illustrates a further quadrant detector in accordance with embodiments of the disclosure.

It can also be seen from Table 1 above, a unique sequence of resistance states is also provided from the just the first two magnetoresistive elements R1 and R2. As such, a simplified quadrant detector may also be implemented, as illustrated by the examples of FIGS. 7 and 8. In FIG. 7, a quadrant detector 7 formed of two magnetoresistive elements R1 and R2 is provided, with a domain wall generator 702A-C provided at the end of both sensor elements. Alternatively, as shown in FIG. 8, a quadrant detector 8 formed of two magnetoresistive elements R1 and R2 is again provided, with a single domain wall generator 802 provided between the two sensor elements.

Figure 9:
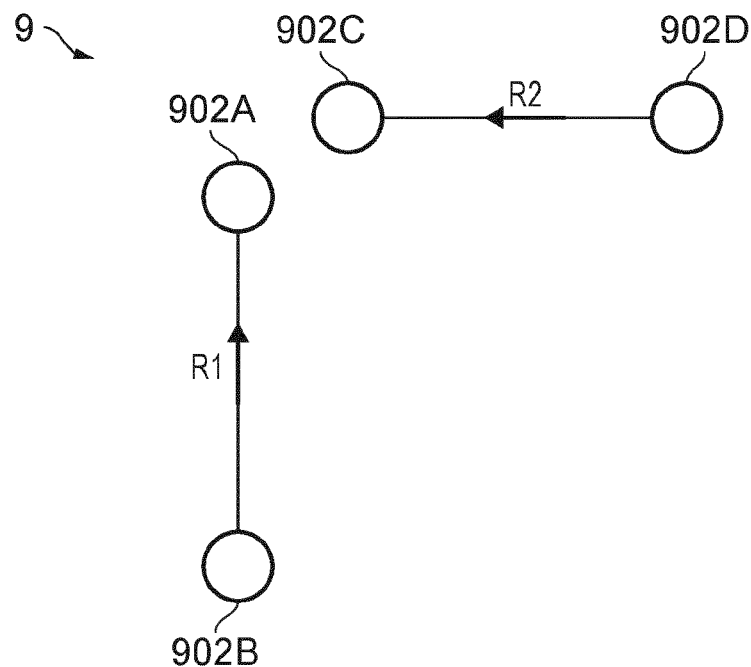
FIG. 9 illustrates a further quadrant detector in accordance with embodiments of the disclosure.
Figure 10:
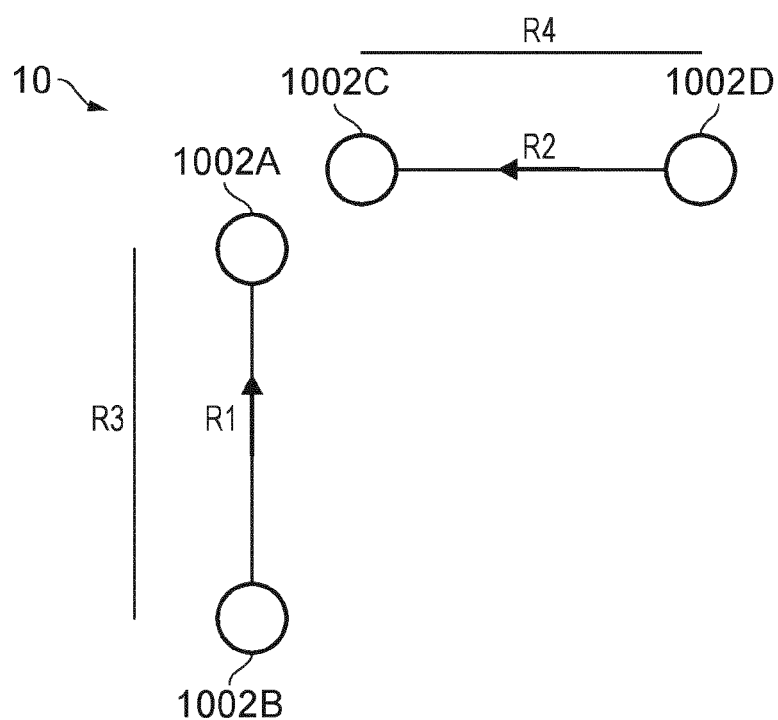
FIG. 10 illustrates a further quadrant detector in accordance with embodiments of the disclosure.

FIG. 9 shows a further example quadrant detector 9 comprising two magnetoresistive elements R1 and R2. In this example, the magnetoresistive elements R1 and R2 are separate from one another, each magnetoresistive element R1 and R2 comprising a domain wall generator 902A-D at both ends. It will however be appreciated that the magnetoresistive elements may each be connected to one domain wall generator. FIG. 10 shows a further example quadrant detector 10 comprising two separate magnetoresistive elements R1 and R2 with domain wall generators 1002A-D at each end, as in FIG. 9, as well as two reference magnetoresistive elements R4 and R4. The reference resistors R3 and R4 may be electrically connected to the quadrant detector magnetoresistive elements R1 and R2 in half-bridges, with resistors R1 and R3 connected as one half bridge output and resistors R2 and R4 connected as another half bridge output. The reference resistors R3 and R4 are arranged so that their magnetic alignment and resistance remains the same to serve as a reference point for the changing magnetic alignment and thus resistance of the quadrant detector magnetoresistive elements R1 and R2.

A benefit of the arrangements shown in FIGS. 9 and 10 is that the magnetoresistive elements of the quadrant detector can be located anywhere on the sensing device 1, whilst arrangements where the magnetoresistive elements are connected in series are more limited in terms of the space available. Further, the magnetoresistive elements can be electrically connected in any suitable way.

Figure 11:
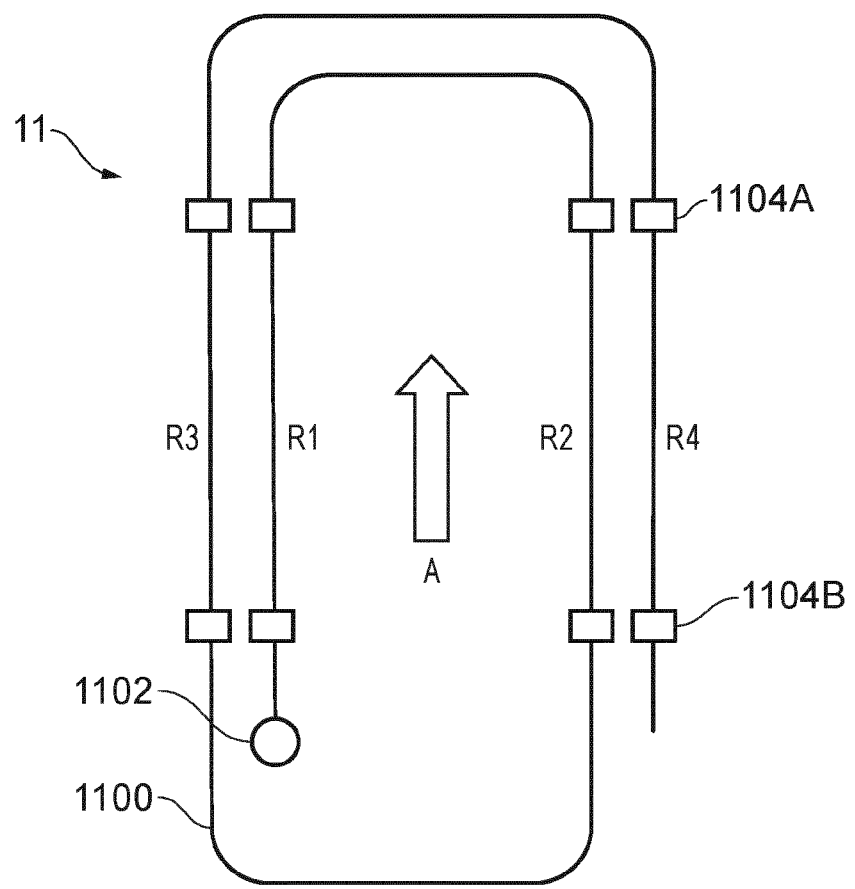
FIG. 11 illustrates a further example of a magnetic multi-turn sensor in accordance with embodiments of the disclosure.

The use of the quadrant detector in accordance with embodiments of the present disclosure will now be described. FIG. 11 illustrates a further example of a multi-turn sensor 11 that may be used as the MT sensor 102 of FIG. 1. The layout of the sensor 11 is similar to that of FIG. 3A in that it comprises a magnetoresistive track 1100 having a plurality of magnetoresistive sensing elements R1-R4 defining two sides of the spiral. The track 1100 is provided with pairs of electrical contacts 1104A-B, the magnetoresistive material between each pair thereby forming the magnetoresistive sensing elements R1-R4. As such, the resistor states will change with each 180° rotation of the magnetic field with a tolerance of +/−10 degrees. As with FIG. 3A, the spiral is provided with a domain wall generator 1102, which injects domain walls into the spiral as an external magnetic field is rotated. In its initialised state (i.e. zero turns), the sensor 11 is initialised such that the magnetic alignment of each magnetoresistive sensing element R1-R4 is pinned at a magnetic field angle of 0° (denoted by the arrow A). As the magnetic field rotates, the domain walls will propagate along the spiral, such that the magnet alignment and thus the resistance of each sensing element R1-R4 changes each time a domain wall passes through, which in this case will be every 180°.

Figure 12:
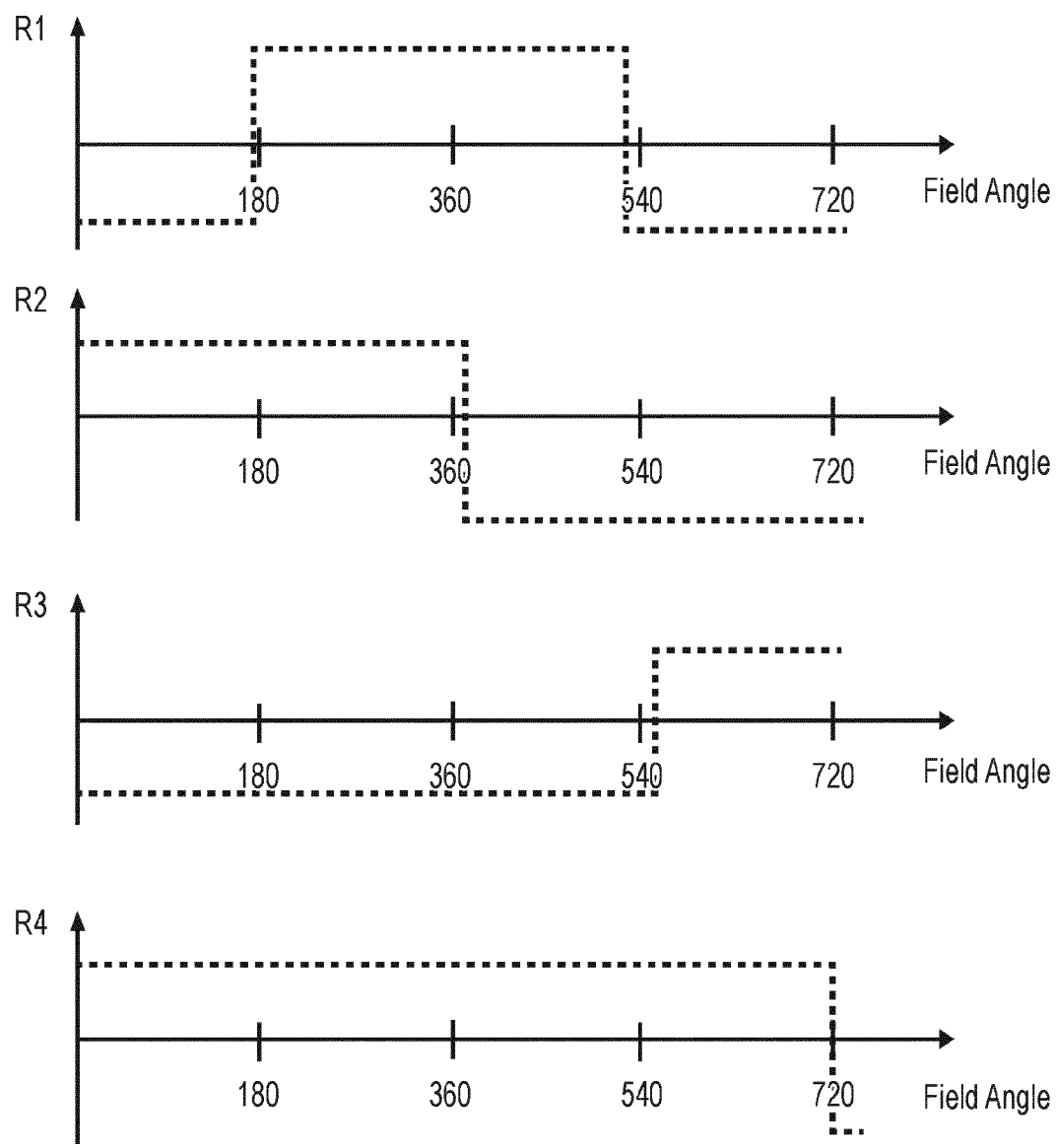
FIG. 12 illustrates an output of the multi-turn sensor of FIG. 9.

FIG. 12 illustrates the outputs of the magnetoresistive elements R1-R4 as the external magnetic field begins to rotate. As can be seen, the transitions from one resistance state to another does not occur within a rotation of exactly 180°. For example, the first transition point of R1 occurs slightly before the magnetic field reaches a field angle of 180°, and the second transition point occurs before the magnetic field reaches a field angle of 540° to an even greater degree. Similarly, the first transition point of R2 occurs after the magnetic field reaches a field angle of 360°.

Figure 13:
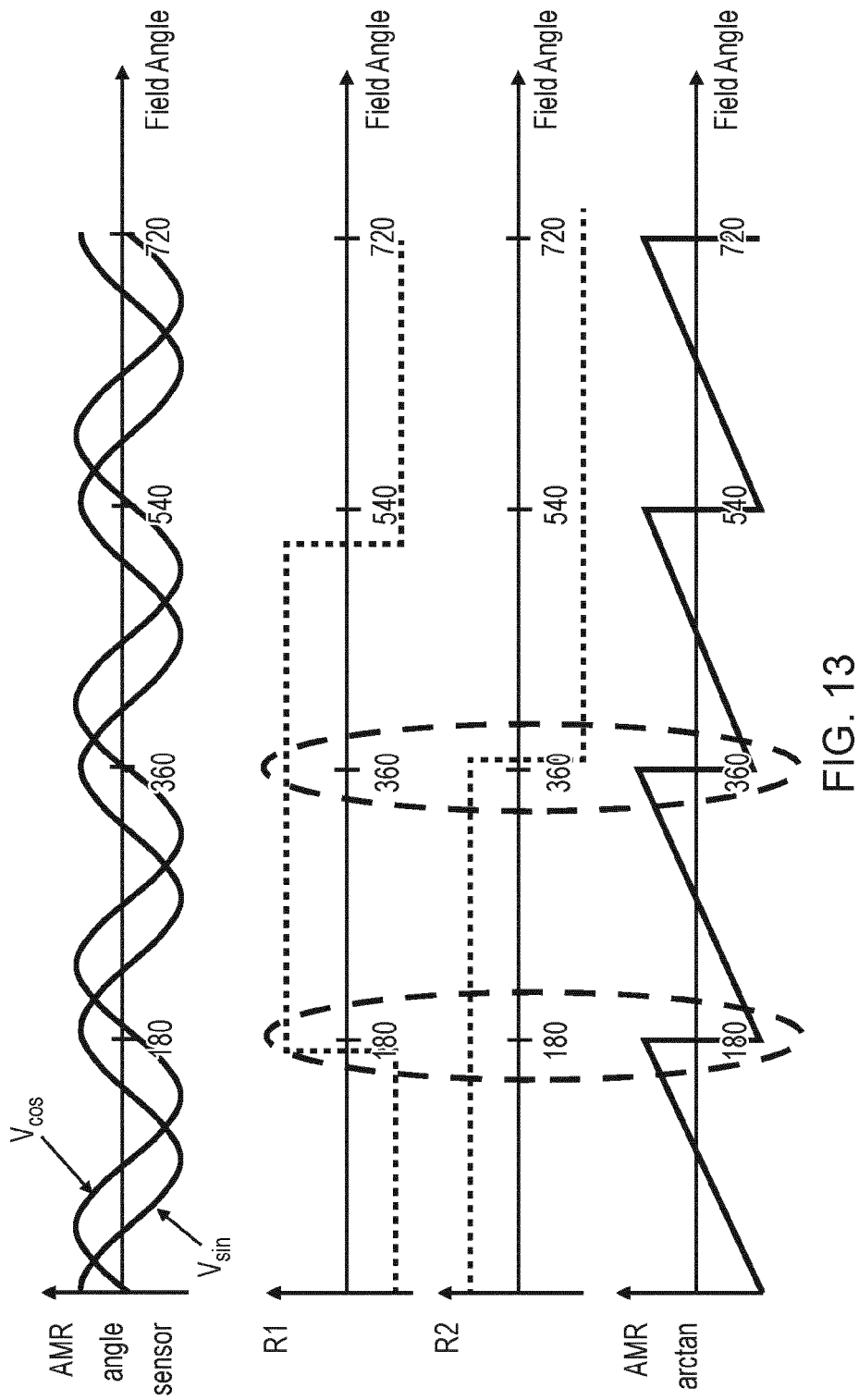
FIG. 13 illustrates the outputs of a multi-turn sensor and an angle sensor in accordance with embodiments of the disclosure.

FIG. 13 illustrates how the absolute angle information from an AMR sensor providing 180° information is not sufficient to resolve these ambiguities. The AMR sensor is typically in the form of two Wheatstone bridge circuits rotated with respect to each other, typically by around 45°, with each Wheatstone bridge circuit comprising a plurality of anisotropic magnetoresistive elements. The signals from each of these Wheatstone bridge circuits will be processed to output a sinusoidal signal having a cosine component $V_{cos}$ and a sine component $V_{sin}$ having a 90° phase shift therebetween. The absolute field angle over 180° is then obtained by performed an arctangent calculation to provide a waveform that repeats every 180°, as illustrated by the graph labelled "AMR arctan".

Using this waveform can result in the measured resistance states for each of the magnetoresistive sensing elements of the MT sensor 11 being misinterpreted. In FIG. 13, only the outputs of elements R1 and R2 are shown for exemplary purposes. Taking the first transition point of R1 as an example, the resistance state has changed prematurely from a low state to a high state such that a high reading is being output when the AMR sensor outputs an angle of 180°. Consequently, the state of the element R1 when the field angle reaches 180° is the same as the resistance state corresponding to a field angle of 360°. As the AMR sensor output simply repeats every 180°, there is no way of knowing whether the state of R1 measured at 180° corresponds to the transition point and thus a field angle of 180°, or a field angle of 360° where no transition is expected.

If the measured resistance is misinterpreted, an incorrect turn count will be output by the MT sensor 11. In some applications, this could have significant consequences, particularly if the turn count is being fed into some other system for control purposes or the like. For example, in steering wheel applications, the turn count may be fed into a power steering system and so it is important that the correct turn count is output to ensure the correct amount of assistive torque is applied to the steering column.

Figure 14:
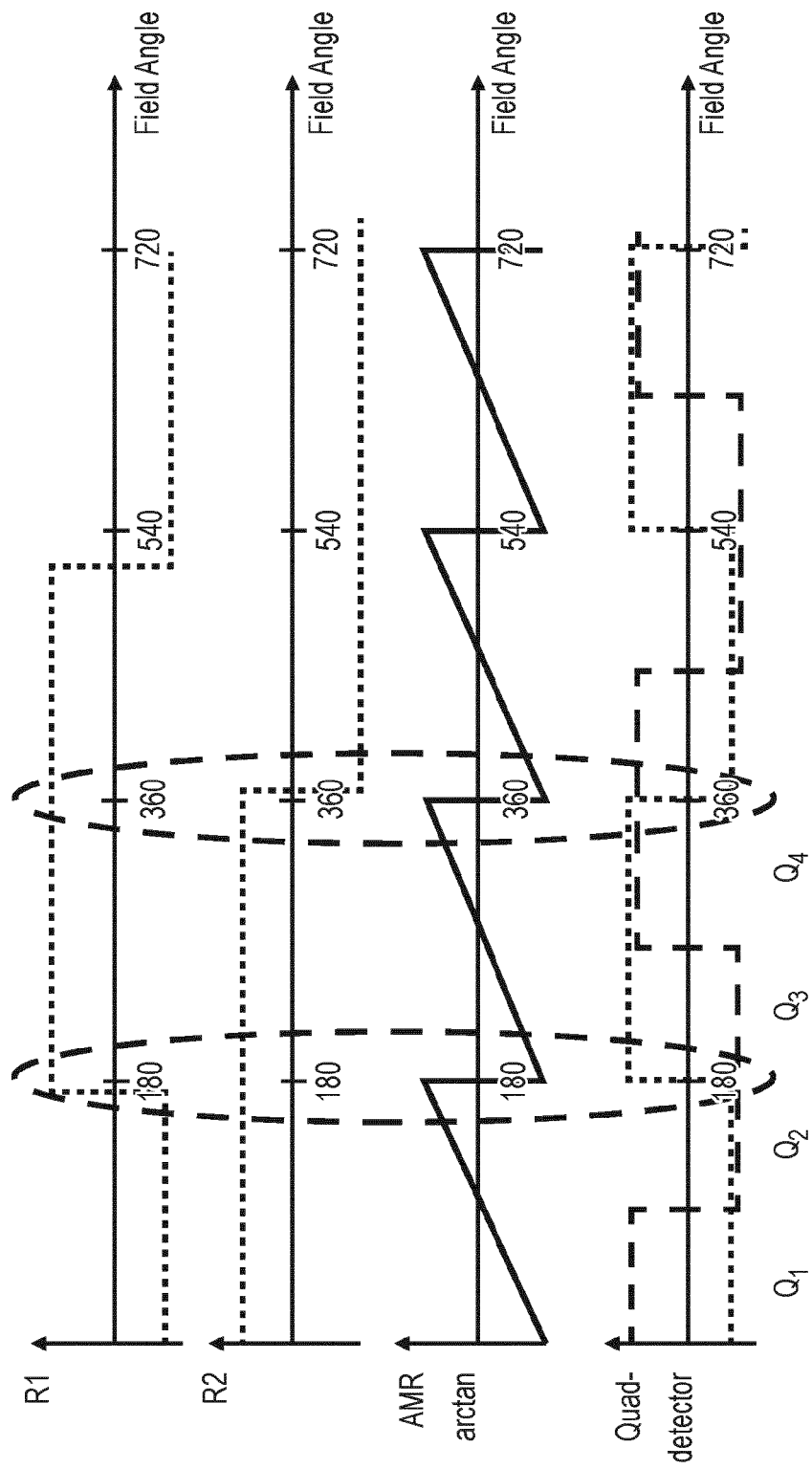
FIG. 14 illustrates the outputs of components of a magnetic sensing device in accordance with embodiments of the disclosure.

This can be remedied by including the quadrant detector information, as illustrated by FIG. 14. Using the example described above for element R1, at the field angle of 180°, the quadrant detector provides a reading indicative of the second quadrant (90° to 180°), $Q_2$. This information effectively tells the turn count decoder 108 that the AMR reading relates to the first 180° turn, and thus the element R1 has prematurely changed from a low to a high resistance. The turn count decoder 108 can therefore correctly interpret these readings as one half turn of the external magnetic field.

Various modifications, whether by way of addition, deletion and/or substitution, may be made to all of the above described embodiments to provide further embodiments, any and/or all of which are intended to be encompassed by the appended claims.

For example, in the example described with reference to FIG. 1, the MT sensor 102, angle sensor 104 and quadrant detector 116 are provided on the same integrated circuit 100. This has numerous advantages such as providing easy installation on a system to be monitored, as well as ensuring that all three sensors are experiencing the same magnetic field. However, it will be appreciated that the sensors may be arranged in some other way, for example, on separate integrated circuits installed in close proximity to one another.

Similarly, whilst the above examples show the magnetoresistive elements of the quadrant detector to be separate to the MT sensor 102, it will be appreciated that the quadrant detector may be built into the MT sensor spiral to save space on the integrated circuit 100. In this respect, the first two or four magnetoresistive elements (i.e. the first half winding or first full winding) could be used as the quadrant detector, with these sensor elements not contributing to the turn count. To facilitate this, the region of the quadrant detector would need to be populated with domain walls at all times. Alternatively, in the case of an open loop MT sensor such as that shown in FIGS. 2A, 3A and 11, the quadrant detector may be connected to the MT sensor via the domain wall generator. Likewise, in arrangements such as those shown in FIGS. 9 and 10, the magnetoresistive elements of the quadrant detector may be provided on the same sensor die as the magnetoresistive elements of the MT sensor 102, these elements again not contributing to the turn count.

As the quadrant detectors are based on measuring the resistance states of magnetoresistive elements, the resistance states can be compared to a reference resistor that is not experiencing a change in magnetisation, such as the arrangement shown in FIG. 10. In doing so, any errors in the resistance states of the quadrant detector will be detected if the reading deviates unexpectedly from the reference resistor state.

The above examples describe a GMR based quadrant detector, however, it will be appreciated that a TMR based quadrant detector may also be implemented. In this respect, two or more strips of soft magnetic material will be connected to TMR tunnel junctions. A passing domain wall will cause the resistance measured at those tunnel junctions to change, thereby indicating the magnetisation state. In this respect, the TMR track may be laid out in the same way as the examples described above.

The invention claimed is:

1. A magnetic sensing device, comprising:
a magnetic multi-turn sensor configured to detect a number of turns of a rotating magnetic field;
an angle sensor configured to detect an orientation of the rotating magnetic field, the angle sensor having a resolution of 180 degrees; and
a quadrant detector comprising at least two magnetoresistive elements, the quadrant detector being configured to detect a quadrant of a magnetic field angle of the rotating magnetic field, the quadrant detector comprising at least one domain wall generator for injecting domain walls into the quadrant detector as the magnetic field rotates.

2. The device according to claim 1, further comprising a processing circuit in communication with the magnetic multi-turn sensor, the angle sensor and the quadrant detector.

3. The device according to claim 2, wherein the at least two magnetoresistive elements of the quadrant detector have at least two states, each state having an associated resistance, wherein the processing circuit is configured to detect a sequence of states of the at least two magnetoresistive elements as the magnetic field rotates to determine the quadrant of the rotating magnetic field, wherein each quadrant corresponds to a predetermined set of states.

4. The device according to claim 2, wherein the processing circuit is configured to process a signal output by the magnetic multi-turn sensor based at least in part on the detected quadrant and the detected orientation of the magnetic field to determine the number of turns.

5. The device according to claim 1, wherein the quadrant detector comprises two separate magnetoresistive elements, wherein each magnetoresistive element is connected to the at least one domain wall generator for injecting domain walls into the quadrant detector as the magnetic field rotates, wherein each magnetoresistive element is connected to two domain wall generators, the two domain wall generators being located at opposite ends of the magnetoresistive elements.

6. The device according to claim 5, wherein the quadrant detector further comprises a pair of reference magnetoresistive elements.

7. The device according to claim 1, wherein the quadrant detector comprises two magnetoresistive elements connected in series wherein the at least one domain wall generator comprises a first domain wall generator connected between the two magnetoresistive elements, and two further domain wall generators, each located at opposite ends of the magnetoresistive elements.

8. The device according to claim 1, wherein the quadrant detector comprises four magnetoresistive elements connected in series in a loop configuration.

9. The device according to claim 8, wherein the at least one domain wall generator comprises two or more domain wall generators, each of the two or more domain wall generators is connected between two magnetoresistive elements.

10. The device according to claim 1, wherein the magnetic multi-turn sensor, the angle sensor and the quadrant detector are arranged on a first integrated circuit board, and the magnetic multi-turn sensor, the angle sensor, and the quadrant detector are formed as separate components in a single semiconductor package.

11. The device according to claim 1, wherein the at least two magnetoresistive elements of the quadrant detector are giant magnetoresistive (GMR) elements or tunnel magnetoresistive (TMR) elements.

12. The device according to claim 1, wherein the angle sensor is an anisotropic magnetoresistive (AMR) based angle sensor.

13. The device according to claim 1, wherein the magnetic multi-turn sensor is a giant magnetoresistive (GMR) based multi-turn sensor, or a tunnel magnetoresistive (TMR) based multi-turn sensor.

14. A magnetic sensing device, comprising:
a magnetic multi-turn sensor configured to detect a number of turns of a rotating magnetic field;
an angle sensor configured to detect an orientation of the rotating magnetic field, the angle sensor having a resolution of 180 degrees; and
a quadrant detector comprising at least two magnetoresistive elements, the quadrant detector being configured to detect a quadrant of a magnetic field angle of the rotating magnetic field,
wherein the magnetic multi-turn sensor comprises a plurality of magnetoresistive elements connected in series and physically laid out in a spiral configuration, wherein the quadrant detector and the magnetic multi-turn sensor are integrated, such that at least two magnetoresistive elements of the plurality of magnetoresistive elements provide the quadrant detector, wherein the magnetic multi-turn sensor further comprises a matrix of electrical connections arranged to electrically connect magnetoresistive elements of the plurality of magnetoresistive elements to other magnetoresistive elements of the plurality of magnetoresistive elements, the matrix being at least three by three.

15. A method of monitoring a rotating magnetic field, comprising:
detecting a number of turns of the rotating magnetic field using a magnetic multi-turn sensor;
detecting an orientation of the rotating magnetic field using an angle sensor having a resolution of 180 degrees;
detecting a quadrant of a magnetic field angle of the rotating magnetic field using a quadrant detector, the quadrant detector comprising at least two magnetoresistive elements and at least one domain wall generator; and
injecting, using the at least one domain wall generator, domain walls into the quadrant detector as the magnetic field rotates;
wherein the number of turns is determined based at least in part on the detected orientation and the detected quadrant.

16. The method according to claim 15, wherein the at least two magnetoresistive elements of the quadrant detector have at least two states, each state having an associated resistance, wherein detecting the quadrant comprises detecting a sequence of states of the at least two magnetoresistive elements as the magnetic field rotates, wherein each quadrant corresponds to a predetermined set of states.

17. The method according to claim 15, wherein the quadrant detector comprises two separate magnetoresistive elements, wherein each magnetoresistive element is connected to the at least one domain wall generator for injecting domain walls into the quadrant detector as the magnetic field rotates, wherein each magnetoresistive element is connected to two domain wall generators, the two domain wall generators being located at opposite ends of the magnetoresistive elements.

18. The method according to claim 15, wherein the quadrant detector comprises two magnetoresistive elements connected in series, wherein the at least one domain wall generator comprises a first domain wall generator connected between the two magnetoresistive elements, and a further domain wall generator located at an opposite end of each magnetoresistive element.

19. The method according to claim 15, wherein the quadrant detector comprises four magnetoresistive elements connected in series in a loop configuration.

20. A computer system comprising:
a processor; and
a computer readable medium storing one or more instruction(s) arranged such that when executed the processor is caused to perform the method of claim 15.

* * * * *